US012747985B2

(12) United States Patent
Naggies et al.

(10) Patent No.: US 12,747,985 B2
(45) Date of Patent: Sep. 29, 2026

(54) PHOTOMETRIC PROCESS MEASUREMENT ARRANGEMENT AND A PHOTOMETRIC MEASUREMENT METHOD

(71) Applicant: HACH LANGE GMBH, Berlin (DE)

(72) Inventors: Andre Naggies, Berlin (DE); Axel Leyer, Berlin (DE); Robert Dalljo, Berlin (DE)

(73) Assignee: HACH LANGE GMBH, Berlin (DE)

( * ) Notice: Subject to any disclaimer, the term of this patent is extended or adjusted under 35 U.S.C. 154(b) by 72 days.

(21) Appl. No.: 18/864,698

(22) PCT Filed: May 10, 2023

(86) PCT No.: PCT/EP2023/062373

§ 371 (c)(1),
(2) Date: Nov. 11, 2024

(87) PCT Pub. No.: WO2023/217835

PCT Pub. Date: Nov. 16, 2023

(65) Prior Publication Data

US 2025/0341422 A1 Nov. 6, 2025

(30) Foreign Application Priority Data

May 12, 2022 (EP) .................................... 22173049

(51) Int. Cl.
*G01J 3/10* (2006.01)
*G01J 3/42* (2006.01)

(52) U.S. Cl.
CPC .. *G01J 3/10* (2013.01); *G01J 3/42* (2013.01)

(58) Field of Classification Search
CPC ........... G01J 1/0228; G01J 1/44; G01J 3/2803
See application file for complete search history.

(56) References Cited

U.S. PATENT DOCUMENTS

2025/0314528 A1* 10/2025 Naggies .................... G01J 3/10

FOREIGN PATENT DOCUMENTS

EP 2320213 A2 5/2011
FR 3088720 A1 5/2020

OTHER PUBLICATIONS

European Patent Office, International Search Report and Written Opinion, Aug. 28, 2023, 9 pages.

* cited by examiner

*Primary Examiner* — Kevin K Pyo
(74) *Attorney, Agent, or Firm* — Ference & Associates LLC

(57) ABSTRACT

A photometric process measurement arrangement (10) comprising a photometric immersion probe (20), the photometric immersion probe (20) comprising a photometer flashlight source (61) for providing photometric light impulses, a photometric detector arrangement (70) comprising at least two separate wavelength-selective detection elements (71, 72, 73), and a photometer control (80) controlling the photometer flashlight source (61) and the detector arrangement (70), the photometer control (80) comprising: impulse signal integrators (819, 829, 839) for integrating the electric impulses having the impulse intensity (Ui) generated by the detection elements (71, 72, 73) of one impulse integration cycle (204; 221; 264), a measurement cycle control (90) for adapting the total number of integrated cycle impulses of an impulse integration cycle (204;221;264) to the impulse intensity (Ui) of the single electric impulses, A/D-converters (81, 82, 83) for converting the voltages of the impulse signal integrators (819, 829, 839) in an A/D conversion interval (100) after the impulse integration cycle (204; 221; 264), a flashlight driving module (120) for controlling an impulse ignition switch (36) triggering the photometer flashlight source (61) with an impulse frequency (fi) during the (Continued)

Figure 1:
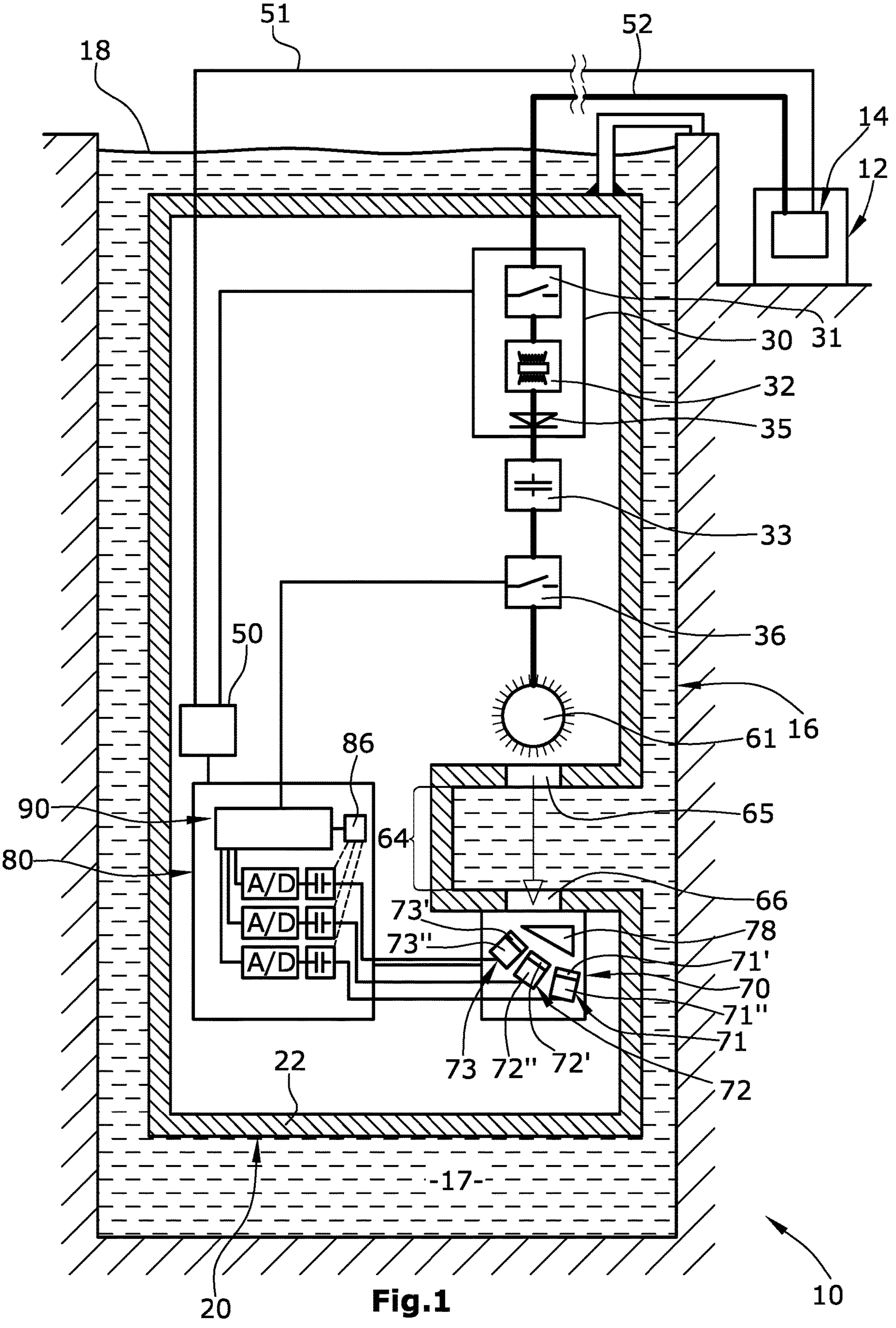

impulse integration cycle (204; 221; 264), and a flashlight thermal management module (130) for balancing the number of photometric light impulses within a time frame (F), for example, by adding an adapted pause interval (303; 311) between the impulse integration cycles (204; 221; 264) depending on the number of integrated cycle impulses, so that the total number of photometric light impulses within the time frame (F) is substantially constant.

12 Claims, 4 Drawing Sheets

PHOTOMETRIC PROCESS MEASUREMENT ARRANGEMENT AND A PHOTOMETRIC MEASUREMENT METHOD

The present application is a National Phase Entry of PCT International Application No. PCT/EP2023/062373, which was filed on May 10, 2023, the contents of which are hereby incorporated by reference, which claims priority to EP Application Serial No. 22173049.2 filed May 12, 2022, the contents of which are hereby incorporated by reference.

The invention refers to a photometric process measurement arrangement with a photometric immersion probe and to a photometric measurement method provided by the photometric process measurement arrangement.

A photometric process measurement arrangement comprises a photometric immersion probe being immersed into the water of a water basin. The water basin can be a part of a water treatment plant for continuously controlling drinking water or for controlling a process step of a wastewater treatment process. A typical photometric immersion probe is disclosed in DE 10 2005 007 142 A1. A state-of-the art immersion probe comprises a photometer flashlight source for providing photometric light impulses with a sufficiently continuous or a quasi-continuous spectrum and comprises a photometric detector arrangement with at least two separate wavelength-selective detection elements.

In a state-of-the-art photometric control, the wavelength-selective detection elements are provided with impulse signal integrators for integrating the electric impulses generated by the detection elements. The impulse signal integrators are capacitors having a saturation voltage which must not be exceeded during the integration process within a measurement cycle so that the number of integratable flashlight source flashes within one impulse integration cycle is limited.

The general application environment of the photometric process measurement arrangement can be very clear drinking water as well as highly turbid wastewater, so that the maximum acceptable number of flashlight source flashes within one impulse integration cycle can range between a very few flashes for very clear drinking water resulting in a relatively high impulse intensity of every single electric impulse to more than a hundred flashes for very turbid waste water resulting in an extremely low impulse intensity of every single electric impulse. However, the capacity of the impulse signal integrators should be utilized as much as possible to optimize the signal to noise ratio for the A/D conversion of the voltages of the impulse signal integrators. Therefore, the number of integrated electric impulses of one impulse integration cycle is adapted to the turbidity of the sample water.

One impulse integration cycle of a measurement cycle can have only four impulses for very clear sample water or can have, for example, more than one hundred impulses for very turbid sample water. A typical flashing interval is 5 to 30 ms. After an impulse integration cycle, an A/D conversion of the voltages of the impulse signal integrators is provided. An A/D conversion interval typically takes 50 to 100 ms, and the photometer flashlight source is stopped during the A/D conversion and does not provide photometric light impulses. As a consequence, the total number photometric light impulses generated by the flashlight source within a defined time frame of, for example 1 Minute, substantially differs between about 1300 flashes per minute for very clear sample water with only four 20 ms-flashes per impulse integration cycle and many 100 ms A/D conversion intervals and 2800 flashes per minute for very turbid sample water with one hundred 20 ms-flashes per impulse integration cycle and only a few 100 ms A/D conversion intervals.

This results in a very different thermal situation of the photometer flashlight source depending on the turbidity of the sample water. The thermal situation of the photometer flashlight source substantially affects the emission spectrum of the flashlight source, and the differing number of flashes per timeframe dramatically affects the lifetime of the flashlight source.

It is an object of the invention to provide a photometric process measurement arrangement providing an adaptive impulse integration cycle management and with an improved thermal management of the photometer flashlight source.

This object is achieved with a photometric process measurement arrangement with the features of independent apparatus claim 1 and with a photometric measurement method with the features of independent method claim 8.

The photometric process measurement arrangement according to the invention is provided with a photometric immersion probe which is preferably continuously and completely immersed into water of a water basin. The immersion probe comprises a photometer flashlight source for providing photometric light impulses with a suitable and sufficiently continuous optical spectrum, preferably with an optical spectrum focused on the ultraviolet range for the determination of the concentration of, for example, nitrate and nitrite. Preferably, the flashlight source is a high voltage gas-discharge lamp, more preferably a xenon flashlight lamp.

The photometric detector arrangement comprises at least two separate wavelength-selective detection elements, which can be a combination of a beam splitter, wavelength-selective filters and photocells, or comprises another suitable arrangement allowing to wavelength-selectively detect the intensities of at least two discrete wavelengths of the light impulses being generated by the flashlight source after being transmitted through the water sample. The photocells can be silicon photocells, and the wavelength-selective filters can be interference bandpass filters.

A photometer control controls the photometer flashlight source by triggering every flashlight source impulse. The photometric control comprises an impulse signal integrator for every detection element for integrating the electric impulses generated by the corresponding detection element. The impulse signal integrator preferably is an electric capacitor. The photometric control comprises A/D-converters for converting the voltages of the impulse signal integrators. Every impulse signal integrator is provided with a corresponding A/D-converter. Every A/D-converter is provided with a high-precision-conversion trigger port. If the high-precision-conversion trigger port is electronically triggered, a high-precision A/D-conversion is initiated. An A/D-conversion with a high-precision can take, for example, up to one hundred milliseconds.

The photometer is provided with a flashlight driving module for controlling an impulse ignition switch triggering the photometer flashlight source with during an impulse integration cycle. Generally, the impulse frequency can be adaptable. Preferably, the impulse frequency is totally constant for the lifetime of the photometric process measurement arrangement. Preferably, the constant impulse period is in the range of 10 to 30 ms.

The photometer control is provided with a measuring cycle control for adapting the total number of integrated cycle impulses of an impulse integration cycle to the impulse intensity of the single electric impulses. In other words, the cycle length and the total number of impulses of an impulse integration cycle after which a A/D conversion is initiated is adapted to the turbidity of the sample water. If the sample water is relatively clear, the number of photometric light impulses which are generated to define an adapted impulse integration cycle is relatively low. If the water sample is relatively turbid, the number of photometric light impulses to define an adapted impulse integration cycle is relatively high.

The adaption of the length and the total number of integrated cycle impulses of an impulse integration cycle generally can be realized in many different ways.

This does not necessarily mean that this adaption is realized for every single impulse integration cycle. The adaption can be provided flexibly or in fixed intervals, for example for every 20th impulse integration cycle or once every minute. The other measurement cycles, which are the slave measurement cycles, are not individually adapted but are identical with the adaption measurement cycle, which is the master measurement cycle. This concept allows to spend more time for precisely analyzing the master measurement cycle than for the following slave measurement cycles, without substantially deteriorating the overall measurement cycle frequency.

The flexible adaption of the length of the measurement cycles allows to utilize the electric capacity of the impulse signal integrators and of the A/D converters to the most possible extend so that the general accuracy of the quantitative determination of a substance in the sample water is substantially increased.

The photometric control is also provided with A/D converters for converting the voltages of the impulse signal integrators in an A/D conversion interval after any impulse integration cycle. A typical A/D conversion interval takes 50 to 100 ms. As soon as an impulse integration cycle has been finished, the photometer flashlight source is stopped, and all A/D-converters are triggered to read and digitalize the voltage of the corresponding impulse signal integrators.

The photometer control is provided with a flashlight thermal management module for balancing the number of photometric light impulses within a timeframe, whereas the timeframe is a time reference being much longer than the longest possible measurement cycle. The flashlight from a management module equalizes the total number of photometric light impulses over a long time frame so that the overall photometric light impulse frequency is constant independently of the impulse intensities and of the resulting impulse integration cycles.

Generally, the balancing could be provided by adapting the period between two photometric light impulses within an impulse integration cycle. Preferably, the flashlight thermal management module balances the number of photometric light impulses within a timeframe by adding an adapted pause interval between the impulse integration cycles as required. The length of the pause interval depends on the total number of integrated measurement cycle impulses of the impulse integration cycle so that the total number photometric light impulses within the considered time frame is substantially constant for the available range of different impulse integration cycles with different total numbers of integrated cycle impulses resulting from different impulse intensities. If the impulse integration cycle is very short, no pause interval needs to be provided. The longer the measurement impulse integration cycle is, the longer is the pause interval provided between two subsequent impulse integration cycles.

The photometer control preferably provides adapted pause intervals between the impulse integration cycles to keep the overall photometric light impulse frequency substantially constant referring to a relatively short timeframe of some minutes as well as to a long timeframe of the measurement arrangement lifetime of at least a few years. This constancy has the physical effect that the electrodes of the photometer flashlight source are driven at a very constant temperature so that the emission spectrum of the photometer flashlight source is identically maintained and the photometric results are consistent for a very long time. Additionally, the total lifetime of the photometer flashlight source can easily be predicted by simply counting the photometric light impulses generated by the photometer flashlight source. Other and more sophisticated measures for supervising the condition of the photometer flashlight source are not necessary.

Preferably, the thermal management module adapts the pause intervals between the impulse integration cycles in that way that the constancy of the number of photometric light impulses within the timeframe is within a tolerance of 10% for all available lengths of impulse integration cycles. More preferably, the constancy is within a tolerance of 5%.

Preferably the adapted pause interval is defined by one or more additional A/D conversion interval. The pause interval is thereby used to improve the accuracy of the A/D conversion process because the total number of A/D conversions is substantially increased for, in particular, relatively long impulse integration cycles.

According to a preferred embodiment of the invention, the measurement cycle control comprises a cycle pattern table memory memorizing difference cycle pattern with a defined impulse integration cycles and related defined pause intervals. The measurement cycle control selects a measurement cycle pattern with defined impulse integration cycle and a defined pause interval in dependency on the impulse intensity at the beginning of an impulse integration cycle. In other words, the length of the impulse integration cycle and the corresponding pause interval can only be chosen from a very limited number of a few measurement cycle pattern.

The available measurement cycle pattern can have, for example, only impulse integration cycles with 4, 8, 16, 21, 32 or 64 integrated electric impulses. Within a timeframe of, for example, 3 seconds one single impulse integration cycle with 64 integrated electric impulses, two impulse integration cycles each with 32 integrated electric impulses, three impulse integration cycles each with 21 integrated electric impulses, four impulse integration cycles each with 16 integrated electric impulses and, eight impulse integration cycles each with 8 integrated electric impulses and sixteen impulse integration cycles each with only 4 integrated electric impulses could be available as parts of the available measurement cycle pattern. As a consequence, the total number of integrated electric impulses within the timeframe is always 63 or 64. The length of the related pause intervals is adapted and defined accordingly.

The decision about the length of an adapted impulse integration cycle or the suitable measurement cycle pattern is made at the beginning of an impulse integration cycle, for example after two or three received and integrated electric impulses. The chosen measurement cycle pattern can be maintained for several time frames or time intervals before a new decision about the suitable measurement cycle pattern is provided.

Using a cycle pattern table memory is relatively simple and does not need substantial computing capacity.

There are generally different technical ways to monitor the development of the voltage of the impulse signal integrators during an impulse integration cycle. Preferably, the monitoring is not realized by providing a high precision A/D conversion after every single flashlight impulse because a high-precision A/D conversion is relatively time-consuming and takes much more time than an interval between two successive photometric light impulses. Preferably, the high precision A/D conversion is not provided more than five times within one single measurement cycle. More preferably, the high-precision A/D conversion is not used at all for the monitoring of the development of the voltage of the impulse signal integrators during an impulse integration cycle, but is only used for the final determination of the voltages of all A/D-converters at the end of an impulse integration cycle.

Preferably, the photometric control is provided with an integrator reset switch for synchronously resetting all impulse signal integrators before a new measurement cycle starts. The integrator reset switch is triggered after all A/D-converters have converted the final voltages of the impulse signal integrators with a high-precision-conversion. The integrator reset switch synchronously pulls the voltages of all impulse signal integrators down to zero so that a new impulse integration cycle can be started.

Preferably, the integration target voltage value is at least 20% below the saturation voltage of the impulse signal integrators but is at least 50% of the saturation voltage. The integration target voltage value must be substantially below the saturation voltage of the impulse signal integrator for the case of a very clear water sample causing a relatively high optical and electrical impulse received by the impulse signal integrator. The offset between the saturation voltage and the integration target voltage value must be higher than the highest possible impulse signal voltage of a single light impulse received by any of the detection elements.

Preferably, the photometric control is provided with a flash counter counting the number of flashes during an impulse integration cycle, and is provided with a maximum flash number memory memorizing a general maximum flash number value of flashes within one single impulse integration cycle. The photometric control triggers the high-precision-converting trigger ports of all A/D-converters when the number of flashes counted by the flash counter equals or exceeds the memorized maximum flash number. Defining a general maximum number of integrated flashes within one measurement cycle is a fallback measure for the case that the sample water is unexpectedly turbid or if other factors unexpectedly massively weaken the light finally received by the wavelength-selective detection elements. In that case, an impulse integration cycle is terminated before the voltage use of any of the impulse signal integrators has exceeded the memorized integration target voltage value. A warning signal can be generated in that case to cause a control and maintenance action.

Preferably, the A/D-converters are provided with a low-precision-conversion trigger port, respectively. All low-precision-conversion trigger ports of all A/D converters can synchronously be triggered by a corresponding low-precision request port of the photometric control, preferably, if the voltages of all impulse signal integrators are below the memorized integration target value. A low-precision conversion of an A/D-converter typically takes a few milliseconds, only, so that the low-precision conversion capability of the A/D-converter can be used in the beginning and/or in the course of an impulse integration cycle to provide a forecast of the total number of photometric light impulses within an impulse integration cycle until the voltage of a first of all impulse signal integrators will exceed the memorized integration target voltage value. This forecast allows to perfectly schedule and plan the moment of the relatively time-consuming high precision A/D conversion at the end of an impulse integration cycle.

The technical minimum time interval between two subsequent photometric light impulses generated by the photometer flashlight source is typically in the range of 5 to 30 ms, so that the low-precision conversion interval of a typical A/D converter is shorter than the flashing interval, and therefore does not substantially affect the photometer impulse frequency.

The method claim according to the invention is directed to a photometric measurement method provided by a photometric process measurement arrangement comprising the features of one of the apparatus claims, and comprises the following method steps controlled by the photometer control:

- generating light impulses with the photometer flashlight source,
- monitoring all impulse signal integrators of the wavelength-selective detection elements and adapting the total number of integrated cycle impulses of an impulse integration cycle to the impulse intensity, and
- adding an adapted pause interval between the impulse integration cycles depending on the number of integrated cycle impulses.

Preferably, the adapted pause interval is defined by one or more additional A/D conversion interval.

Preferably, the measurement cycle control selects a cycle pattern from the cycle pattern table memory dependent on the impulse intensity of the current impulse integration cycle.

Figure 2:
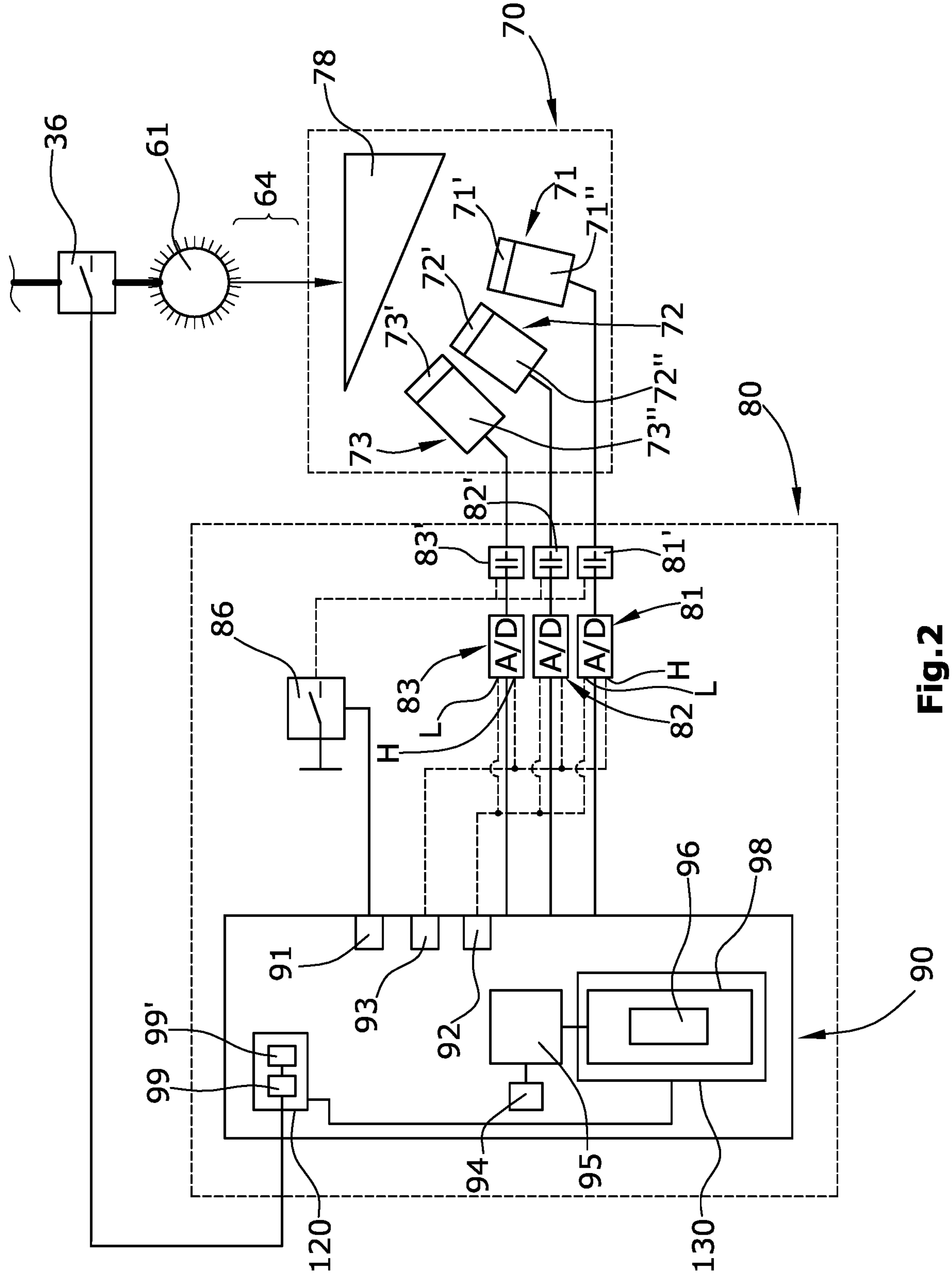

One embodiment of the invention is described with reference to the enclosed drawings, wherein FIG. 1 schematically shows a photometric process measurement arrangement with a photometric immersion probe comprising a photometric detector arrangement and a photometer control, FIG. 2 schematically shows the photometric detector arrangement and the photometer control of FIG. 1 in more detail, and FIGS. 3*a* to 3*d* show diagrams of the voltage versus time of the impulse signal integrator with the highest received light impulse intensity of the photometer control of FIGS. 1 and 2 for different sample water absorptions and turbidities.

FIG. 1 schematically shows a photometric process measurement arrangement 10 substantially consisting of a land-based control unit 12 and a photometric immersion probe 20 being arranged remote from the land-based control unit 12. The immersion probe 20 is arranged below a water surface 18 and is completely immersed into water 17 of a water basin 16. The water basin 16 can be a part of a wastewater treatment plant. Alternatively, the immersion probe 20 can be used in a laboratory application for continuously controlling a water parameter.

The measurement arrangement 10 is generally suitable for quasi-continuously photometrically determine the concentration of at least one water parameter. In the present embodiment, the photometric process measurement arrangement 10 determines the concentration of nitrite and nitrate in the sample water 17 with a measurement frequency of a few seconds.

The photometric immersion probe 20 comprises, within a fluidtight probe housing 22, an electronic flyback-converter 30 for energizing an impulse energy capacitor 33, comprises an impulse ignition switch 36 and a photometer flashlight source 61 being a xenon flash lamp for providing photometric light impulses with a sufficiently quasi-continuous spectrum in the ultraviolet range. The flyback-converter 30 is supplied by the land-based control unit 12 with electric energy via an electric supply line 52, and comprises a converter switch 31, a transformer 32 and a blocking diode 35. The charging duration for charging a completely empty impulse energy capacitor 33 is about 5 to 10 ms until the impulse energy capacitor's voltage reaches a defined ignition voltage value.

The photometric immersion probe 20 comprises a photometric detector arrangement 70 with an optical beam splitter 78 and three separate wavelength-selective detection elements 71, 72, 73. Every wavelength-selective detection element 71, 72, 73 comprises an interference bandpass filter 71',72',73' and a corresponding photocell 71",72",73". The detection elements 71, 72, 73 detect the light impulses generated by the flashlight source 61 at wavelengths of 218 nm, 225 nm and 245 nm. The 218 nm and the 225 nm detection elements 71, 72 are used for the direct detection of the extinction/absorption caused by the nitrite and the nitrate concentration in the probe water. The 245 nm detection element 73 is a reference detector for supervising the general constitution and performance of the flashlight source 61 and of the optical path between the flashlight source 61 and the detection elements 71,72,73. The photometer flashlight source 61 and the photometric detector arrangement 70 define a photometer device for detecting the light absorption of sample water in a photometric measuring section 64 defined between a measuring section light inlet window 65 and a measuring section light outlet window 66.

The photometric immersion probe 20 comprises a photometer control 80 with three impulse signal integrators 81',82',83', three corresponding A/D-converters 81,82,83, an integrator reset switch 86 and a measurement cycle control 90. The impulse signal integrators 81',82',83' technically are capacitor elements and accumulate the electric voltage impulses generated by the photometric detection unit 70 until the integrator reset switch 86 is closed and all impulse signal integrators 81', 82' 83' are discharged. The impulse signal integrators 81', 82' 83' have a saturation voltage Us of, for example, 2600 mV.

The three A/D-converters 81,82,83 each have a high-precision-converting trigger port H and a low-precision-converting trigger port L. When the low-precision-converting trigger ports L of the three A/D-converters 81, 82, 83 are synchronously triggered, low-precision A/D conversions of the actual voltages of the three corresponding impulse signal integrators 81', 82' 83' are provided which takes only a about 2 ms. The low-precision-conversion takes less time than the charging of the impulse energy capacitor 33.

When the high-precision-converting trigger ports H of the three A/D converters 81, 82, 83 are synchronously triggered, very precise and high-precision A/D-conversions of the actual voltages of the three corresponding impulse signal integrators 81', 82', 83' are provided by the corresponding A/D converters 81, 82, 83 which takes about 65 ms. The high-precision-conversion takes much more time than the charging of the impulse energy capacitor 33.

The measurement cycle control 90 comprises a reset port 91 for activating the integrator reset switch 86, comprises a low-precision request port 92 for synchronously requesting a relatively fast low-precision A/D conversion with a short converting time via the low-precision-converting trigger ports L of the A/D converters 81, 82, 83, and comprises a high-precision-request port 93 for synchronously requesting a high-precision A/D conversion with high precision and a relatively long converting time via the high-precision-converting trigger ports H of the three A/D converters 81, 82, 83.

The measurement cycle control 90 comprises a flashlight driving module 120 controlling the impulse ignition switch 36 triggering the photometer flashlight source 61 with a constant impulse frequency during a an impulse integration cycle 204; 221; 264. The measurement cycle control 90 also comprises a flash counter 99 counting and controlling the number of cycle flashes FL generated by the flashlight source 61 within one impulse integration cycle 204; 221; 264 and comprises a maximum flashing number memory 99' memorizing a maximum flash number FLmax of, in this embodiment, 64 flashes.

The measuring cycle control 90 further comprises an integration target memory 94 memorizing an integration target voltage value Ut and comprises an evaluation module 95 for continuously evaluating the digital A/D-converter results in relation to the integration target voltage value Ut. The integration target voltage value Ut is, in the present embodiment, 2000 mV.

The measurement cycle control 90 also comprises a flashlight thermal management module 130 which comprises a cycle pattern selection unit 98 and a dedicated cycle pattern table memory 96. The cycle pattern selection unit 98 including the cycle pattern table memory 96 can be used as an alternative to the use of the evaluation module 95 and the integration target memory 94.

The flashlight thermal management module 130 basically balances the total number of photometric light impulses with in a timeframe F so that the total number of photometric light impulses within the time frame F is substantially constant within a tolerance of less than 3%. The flashlight thermal management module 130 balances the number of photometric light impulses within the timeframe F by adding adapted pause intervals 303; 311 between the impulse integration cycles 204; 221; 264 which will be explained with reference to the FIGS. 3*a* to 3*d*.

The immersion probe 20 comprises an electronic probe control 50 for controlling the communication between the photometer control 80 of the immersion probe 20 and a control electronics 14 of the land-based control unit 12 via a signal line 51.

When the photometer control 80 starts a new frame cycle having the length of a time frame F, the impulse ignition switch 36 is electronically caused by the flashlight driving module 120 to provide photometric light impulses generated by the photometer flashlight source 61 with a constant flashing interval of, for example, about 20 ms. After the second photometric light impulse of the new measurement cycle, the photometer control 80 requests a low-precision-conversion via the low-precision request port 91 and the connected low-precision-conversion trigger ports L of all A/D-converters 81, 82, 83, and determines a very rough value of the impulse intensity Ui of a single electric impulse of the new impulse integration cycle 204; 221; 264.

The determined rough impulse intensity Ui is evaluated by the cycle pattern selection unit 98 to select a suitable cycle pattern memorized in the cycle pattern table memory 96. A cycle pattern is a defined combination of an impulse integration cycle 204; 221; 264, an A/D conversion interval 100 and an adapted pause interval 303; 311 after the A/D conversion interval 100. In the present embodiment, the cycle pattern table memory 96 memorizes cycle pattern with impulse integration cycles with 4, 8, 16, 21, 32 and 64 integrated impulses and with adapted pause intervals. A pause interval 303; 311 is defined by one or more additional A/D conversion intervals 101-111. The combination off the impulse integration cycle 204; 221; 264 together with the first A/D conversion interval 100 defines a measurement cycle MC.

The selection of the suitable cycle pattern is always provided for the highest impulse intensity Ui of all detection elements 71, 72, 73 and guarantees that after the last impulse of the impulse integration cycle 204; 221; 264 the integrated intensity U of at least one of the detection elements 71, 72, 73 is above an integration target voltage value Ut.

Alternatively to the selection of a suitable cycle pattern from the cycle pattern table memory 96, the length of an impulse integration cycle can be determined more accurately: The evaluation module 95 continuously compares the digital low-precision voltage values U provided by the A/D-converters 81, 82, 83 with the memorized integration target voltage value Ut memorized in the integration target memory 94. As long as the highest digital voltage value U of all A/D converters 81, 82, 83 is below the memorized integration target voltage value Ut, the impulse integration cycle is continued by continuing the flashing action.

As soon as the voltage U of the first of all impulse signal integrators 81', 82', 83' has exceeded the memorized integration target voltage value Ut, the flashing action is stopped and an A/D conversion interval 100 is initiated. After the A/D conversion interval 100, the flashlight thermal management module 130 causes a suitable pause interval before the following impulse integration cycle is started.

For providing the A/D conversion interval 100, the photometer control 80 requests a synchronous high-precision-A/D-conversion via the high-precision request port 93 and the corresponding high-precision-converting trigger ports H of all A/D converters 81, 82, 83 to determine the final digital voltage value of all impulse signal integrators 81', 82', 83'.

These final digital voltage values are converted into corresponding concentration values of nitrite and nitrate in the sample water 17 and into a corresponding device condition value. After the high-precision conversion, the reset port 91 of the measuring cycle control 90 causes the integrator reset switch 86 to reset the impulse signal integrators 81', 82' 83' to be reset to a voltage value of zero, so that the photometer is a ready for the following measurement cycle.

FIGS. 3*a* to 3*d* show frame cycles for different sample water absorptions for that detector element receiving the highest light intensity of all three detector elements 71, 72, 73. The impulse time interval ti is always constant and is about 20 ms. The high-precision conversion time interval tc of a single high-precision conversion interval 100 is always constant and is about 65 ms.

Figures 3A, 3B:
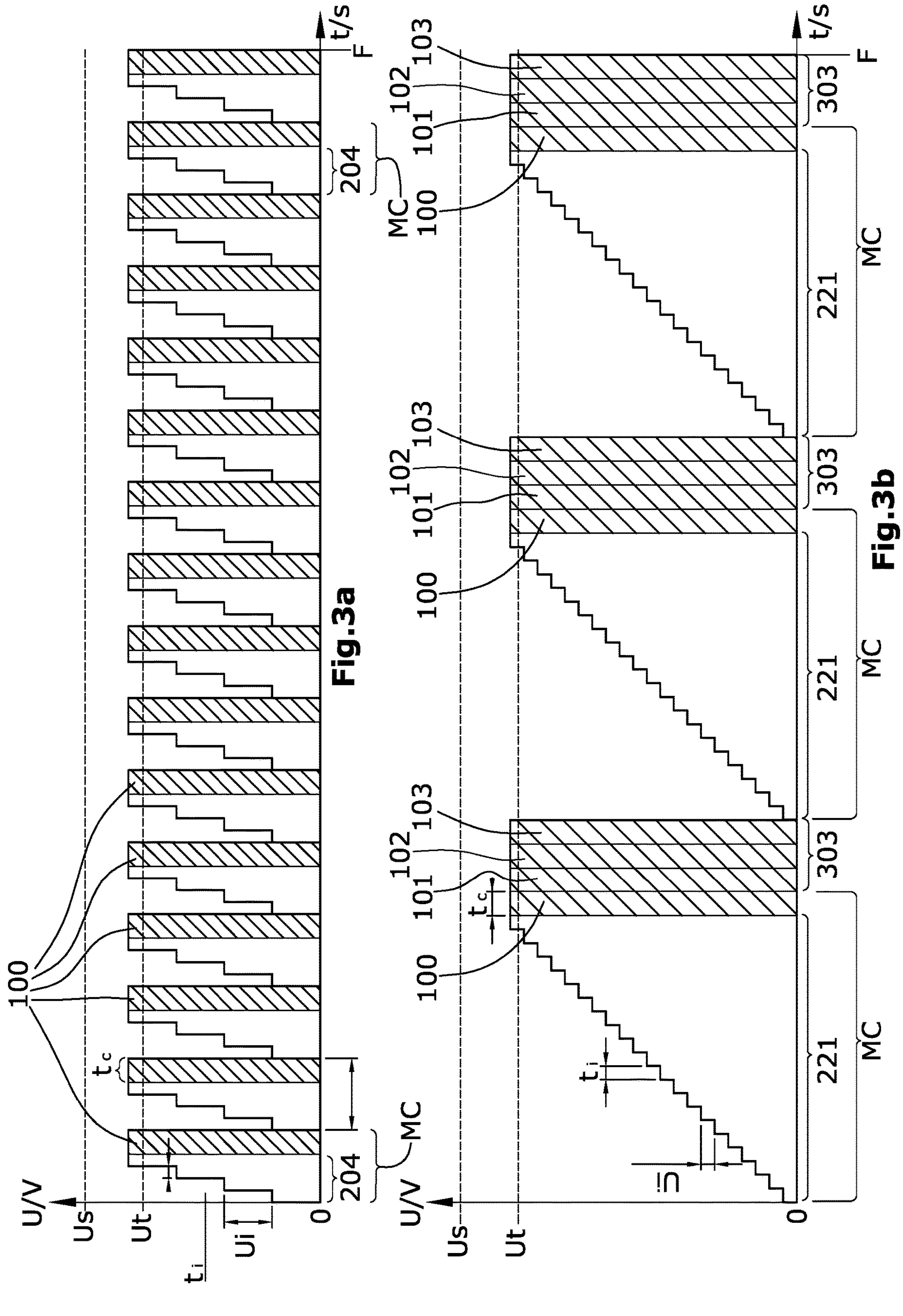

FIG. 3*a* shows, for the one detector element receiving the highest light intensity, 16 identical measurement cycles MC for very clear drinking water causing a very low general light absorption. Every photometric light impulse therefore causes a relatively high impulse voltage Ui at the corresponding impulse signal integrator 81', 82', 83'. After the third flashlight source impulse, the measuring cycle control 90 receives the integrated low-precision digital voltage value U of the corresponding A/D converter 81, 82, 83, and the cycle pattern selection unit 98 selects the suitable cycle pattern shown in FIG. 3*a*.

The measuring cycle control 90 stops the flashing action after the $4^{th}$ impulse and causes all A/D converters 81, 82, 83 to provide a high-precision conversion with the maximum converter resolution of 16 bit. After the high-precision conversion has been finalized, the integrator reset switch 86 is closed for synchronously resetting and completely discharging all impulse signal integrators 81', 82', 83' so that a new measurement cycle MC can be started successively.

Figure 3C:
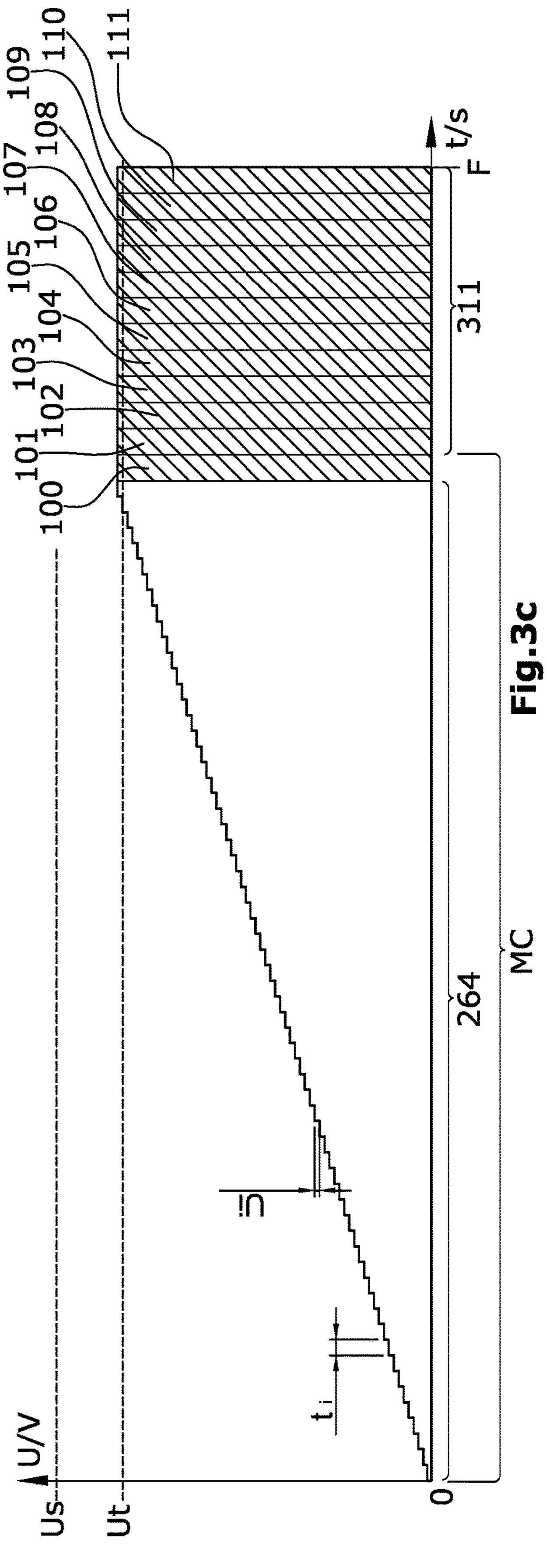
Figure 3D:
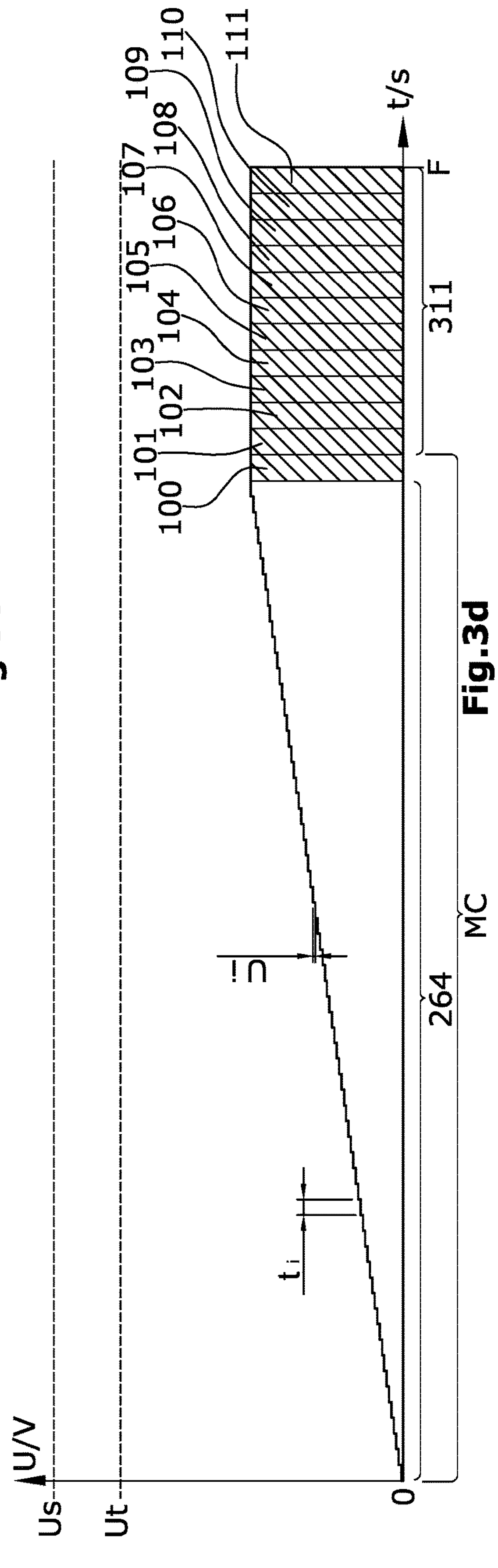

FIGS. 3*b* and 3*c* show measurement cycles MC for more turbid sample water causing less intensive single impulse voltages Ui and causing correspondingly longer measurement cycles MC. As can be seen in FIGS. 3*b*, 3*c* and 3*d*, the cycle pattern include adapted pause intervals 303; 311 with 3 or 11 A/D conversion intervals 101-111 defining the adapted pause intervals 303; 311.

FIG. 3D shows a measurement cycle MC and a corresponding cycle pattern for a very turbid water sample with a very low single impulse voltage Ui.

Generally, the measurement cycle control 90 including the flashlight thermal management module 130 determines and defines a complete frame cycle after the first impulses of the frame cycle. A new adaption of impulse integration cycles is not provided before the following frame cycle.

The invention claimed is:

1. A photometric process measurement arrangement, comprising:

- a photometric immersion probe, the photometric immersion probe comprising a photometer flashlight source for providing photometric light impulses;
- a photometric detector arrangement comprising at least two separate wavelength-selective detection elements; and
- a photometer control controlling the photometer flashlight source and the detector arrangement, the photometer control, comprising:
- impulse signal integrators for integrating the electric impulses having the impulse intensity generated by the detection elements of one impulse integration cycle;
- a measurement cycle control for adapting the total number of integrated cycle impulses of an impulse integration cycle by monitoring voltages of the impulse signal integrators during the impulse integration cycle and terminating the impulse integration cycle when the voltage of the first of all impulse signal integrators reaches or exceeds a predetermined integration target voltage value, thereby adapting to the impulse intensity of the single electric impulses;
- A/D-converters for converting the voltages of the impulse signal integrators in an A/D conversion interval after the impulse integration cycle;
- a flashlight driving module for controlling an impulse ignition switch triggering the photometer flashlight source during the impulse integration cycle; and
- a flashlight thermal management module for balancing the number of photometric light impulses within a time frame depending on the number of integrated cycle impulses, so that the total number of photometric light impulses within the time frame is substantially constant by selectively inserting adapted pause intervals between successive impulse integration cycles.

2. The photometric process measurement arrangement of claim 1, wherein the flashlight thermal management module balances the number of photometric light impulses within a time frame by adding an adapted pause interval between the impulse integration cycles.

3. The photometric process measurement arrangement of claim 2, wherein the flashlight thermal management module adapts the pause intervals between the impulse integration cycles so that the constancy of the number of photometric light impulses within the timeframe is within a tolerance of 10% for all possible variations of impulse integration cycles.

4. A photometric process measurement arrangement of claim 2, wherein the adapted pause interval is defined by one or more additional A/D conversion interval.

5. A photometric process measurement arrangement of claim 1, wherein the measurement cycle control comprises a cycle pattern table memory memorizing different cycle pattern with defined impulse integration cycles and related defined pause intervals, wherein the measurement cycle control selects a cycle pattern with a defined impulse integration cycle and a defined pause interval in dependency on the impulse intensity.

6. The photometric process measurement arrangement of claim 1, wherein the measurement cycle control comprises an integration target voltage memory memorizing an integration target voltage value, wherein the photometer control finishes the impulse integration cycle and starts the A/D conversion interval after the voltage of the first of all impulse signal integrators has exceeded the memorized integration target voltage value.

7. The photometric process measurement arrangement of claim 1, wherein the photometer control is provided with a flash counter counting the number of flashes during the impulse integration cycle and with a maximum flash number memory memorizing a maximum flash number of a measurement cycle, and the photometer control finishes the impulse integration cycle when the number of flashes counted by the flash counter equals the maximum flash number.

8. The photometric process measurement arrangement of claim 6, wherein the integration target voltage value is at least 20% below the saturation voltage of the impulse signal integrators.

9. A photometric measurement method provided by the photometric process measurement arrangement of claim 1, with the following method steps controlled by the photometer control:

generating light impulses with the photometer flashlight source;

monitoring all impulse signal integrators of the wavelength-selective detection elements;

adapting the total number of integrated cycle impulses of an impulse integration cycle to the impulse intensity; and balancing the number of photometric light impulses within the timeframe so that the total number of photometric light impulses within the timeframe is substantially constant by inserting adapted pause intervals between impulse integration cycles.

10. The photometric measurement method of claim 9, wherein the balancing is provided by adding an adapted pause interval between the impulse integration cycles depending on the number of integrated cycle impulses.

11. The photometric measurement method of claim 10, wherein the adapted pause interval is defined by one or more additional A/D conversion interval.

12. The photometric measurement method of one of claim 9, wherein the measurement cycle control selects a cycle pattern from the cycle pattern table memory dependent on the impulse intensity of the current impulse integration cycle.

* * * * *